US010592309B2

(12) United States Patent
Kurian et al.

(10) Patent No.: US 10,592,309 B2
(45) Date of Patent: Mar. 17, 2020

(54) USING SMART DATA TO FORECAST AND TRACK DUAL STAGE EVENTS

(71) Applicant: Bank of America Corporation, Charlotte, NC (US)

(72) Inventors: Manu Kurian, Dallas, TX (US); Sarah L. Hession-Krueger, Walpole, MA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/831,599

(22) Filed: Dec. 5, 2017

(65) Prior Publication Data

US 2019/0171499 A1 Jun. 6, 2019

(51) Int. Cl.
| | |
|---|---|
| *G06F 3/00* | (2006.01) |
| *G06F 9/54* | (2006.01) |
| *G06Q 30/06* | (2012.01) |
| *H04W 4/18* | (2009.01) |
| *H04L 29/08* | (2006.01) |
| *G06N 20/00* | (2019.01) |
| *G06F 16/14* | (2019.01) |
| *G06F 3/048* | (2013.01) |

(52) U.S. Cl.
CPC .............. *G06F 9/542* (2013.01); *G06F 16/14* (2019.01); *G06N 20/00* (2019.01); *G06Q 30/0631* (2013.01); *H04L 67/125* (2013.01); *H04W 4/185* (2013.01); *G06F 3/048* (2013.01)

(58) Field of Classification Search
CPC ...................................................... G06F 9/542

USPC ......................................................... 719/318
See application file for complete search history.

(56) References Cited

U.S. PATENT DOCUMENTS

| | | | |
|---|---|---|---|
| 5,862,223 A | 1/1999 | Walker et al. | |
| 7,324,966 B2 | 1/2008 | Scheer | |
| 7,379,899 B1 * | 5/2008 | Junger | G06Q 20/203 235/385 |
| 7,437,703 B2 | 10/2008 | Wu | |
| 7,783,515 B1 | 8/2010 | Kumar et al. | |

(Continued)

OTHER PUBLICATIONS

Kevin Curran, Near Field Communication (Year: 2012).*

*Primary Examiner* — Lechi Truong
(74) *Attorney, Agent, or Firm* — Banner & Witcoff, Ltd.; Michael A. Springs

(57) ABSTRACT

Aspects of the disclosure relate to using smart data to forecast and track dual stage events. A computing platform may receive, via the communication interface and from a user device, information indicating a dual stage event corresponding to an item. Thereafter, the computing platform may retrieve, from an external event data source and based on the information indicating the dual stage event, metadata corresponding to the dual stage event. Then, the computing platform may determine, based on the metadata corresponding to the dual stage event, a first value corresponding to the dual stage event. Subsequently, the computing platform may generate, based on the information indicating the dual stage event corresponding to the item, one or more commands directing a smart data server to determine a second value corresponding to the dual stage event. Next, the computing platform may transmit, to the smart data server, the one or more commands.

17 Claims, 9 Drawing Sheets

300

Mobile Application For Tracking Dual Stage Events

User Profile: ∿ 310

Item: ∿ 320

Notifications for Item: ∿ 330

Return Item? ∿ 340

(56) References Cited

U.S. PATENT DOCUMENTS

| | | |
|---|---|---|
| 7,958,067 B2 | 6/2011 | Schmidtler et al. |
| 8,069,084 B2 | 11/2011 | Mackouse |
| 8,239,229 B1 | 8/2012 | Paiz |
| 8,311,895 B1 * | 11/2012 | Murugan ............ G06Q 50/28 705/26.1 |
| 8,315,900 B2 | 11/2012 | Schwarz et al. |
| 8,355,963 B2 | 1/2013 | Sicard |
| 8,386,325 B2 | 2/2013 | Bock et al. |
| 8,401,908 B2 | 3/2013 | Bildmayer et al. |
| 8,498,902 B1 | 7/2013 | Kogen et al. |
| 8,660,950 B2 | 2/2014 | MacKouse |
| 8,676,708 B1 | 3/2014 | Honey |
| 8,712,804 B2 | 4/2014 | Wottowa et al. |
| 8,712,885 B2 | 4/2014 | Naccache |
| 8,738,476 B2 | 5/2014 | Wocher et al. |
| 8,818,884 B2 | 8/2014 | Marschall et al. |
| 8,972,292 B2 | 3/2015 | Calman et al. |
| 9,159,058 B2 | 10/2015 | Fleishman et al. |
| 9,396,388 B2 | 7/2016 | Amtrup et al. |
| 10,332,195 B2 * | 6/2019 | Minsky ............ G06Q 30/0643 |
| 2004/0122690 A1 * | 6/2004 | Willoughby ........... G06Q 10/08 705/337 |
| 2006/0149577 A1 * | 7/2006 | Stashluk, Jr. ...... G06Q 10/0837 705/340 |
| 2008/0195694 A1 * | 8/2008 | Alaniz ................ H04L 41/5064 709/203 |
| 2010/0161478 A1 | 6/2010 | Cavanaugh et al. |
| 2011/0208606 A1 * | 8/2011 | Hadar ................ G06Q 30/0222 705/26.2 |
| 2015/0032615 A1 | 1/2015 | Blackhurst et al. |
| 2015/0100468 A1 * | 4/2015 | Blackhurst ............ G06Q 40/02 705/35 |
| 2016/0189155 A1 | 6/2016 | Hu et al. |
| 2017/0053278 A1 | 2/2017 | Gerard et al. |
| 2017/0177575 A1 | 6/2017 | Florimond et al. |
| 2017/0272945 A1 | 9/2017 | Link, II |
| 2017/0277122 A1 | 9/2017 | Duffy |
| 2017/0278140 A1 | 9/2017 | Duffy |
| 2017/0279957 A1 | 9/2017 | Abramson et al. |
| 2017/0283845 A1 | 10/2017 | Holmes et al. |
| 2017/0286621 A1 | 10/2017 | Cox et al. |
| 2017/0286622 A1 | 10/2017 | Cox et al. |
| 2017/0287100 A1 | 10/2017 | Liktor et al. |
| 2017/0289323 A1 | 10/2017 | Gelvin et al. |
| 2017/0289341 A1 | 10/2017 | Rodriguez et al. |
| 2017/0293663 A1 | 10/2017 | Oros et al. |
| 2017/0293675 A1 | 10/2017 | York et al. |
| 2017/0293693 A1 | 10/2017 | Oros et al. |
| 2017/0293841 A1 | 10/2017 | McAllister et al. |
| 2017/0293845 A1 | 10/2017 | McAllister et al. |
| 2017/0295072 A1 | 10/2017 | McFall |
| 2017/0295256 A1 | 10/2017 | Moriarty et al. |
| 2017/0295522 A1 | 10/2017 | Shalev et al. |
| 2017/0299199 A1 | 10/2017 | Daniels et al. |
| 2017/0299402 A1 | 10/2017 | Hansen et al. |
| 2017/0300656 A1 | 10/2017 | Cox et al. |
| 2017/0301181 A9 | 10/2017 | Lyons et al. |
| 2017/0302785 A1 | 10/2017 | Abramson et al. |
| 2017/0302794 A1 | 10/2017 | Spievak et al. |
| 2017/0308644 A1 | 10/2017 | van Rooyen et al. |
| 2017/0312746 A1 | 11/2017 | Holmes et al. |
| 2017/0314369 A1 | 11/2017 | Rosano et al. |
| 2017/0315683 A1 | 11/2017 | Boucher et al. |
| 2017/0315691 A1 | 11/2017 | Moha et al. |
| 2017/0315694 A1 | 11/2017 | Alonso Ruiz et al. |
| 2017/0315967 A1 | 11/2017 | Boucher et al. |
| 2017/0315968 A1 | 11/2017 | Boucher et al. |
| 2017/0315978 A1 | 11/2017 | Boucher et al. |
| 2017/0315979 A1 | 11/2017 | Boucher et al. |
| 2017/0316487 A1 | 11/2017 | Mazed |
| 2017/0323481 A1 | 11/2017 | Tran et al. |
| 2017/0328740 A1 | 11/2017 | Widmer et al. |
| 2017/0329729 A1 | 11/2017 | Chew |
| 2017/0330229 A1 | 11/2017 | Bryant et al. |
| 2017/0331577 A1 | 11/2017 | Parkvall et al. |
| 2017/0331670 A1 | 11/2017 | Parkvall et al. |
| 2017/0331899 A1 | 11/2017 | Binder et al. |
| 2017/0332121 A9 | 11/2017 | Bhatia et al. |
| 2017/0332304 A1 | 11/2017 | Agee et al. |
| 2017/0332386 A1 | 11/2017 | Li et al. |
| 2017/0337728 A1 | 11/2017 | Bar-On |
| 2017/0337813 A1 | 11/2017 | Taylor |
| 2017/0339739 A1 | 11/2017 | Pallen et al. |
| 2017/0344114 A1 | 11/2017 | Osterhout et al. |
| 2017/0345323 A1 | 11/2017 | Martinez Sanchez et al. |

* cited by examiner

USING SMART DATA TO FORECAST AND TRACK DUAL STAGE EVENTS

BACKGROUND

Aspects of the disclosure relate to data processing, data mining, file management, and retrieval of information stored in a database. In particular, one or more aspects of the disclosure relates to using smart data to forecast and track dual stage events.

In some instances, enterprise systems may receive information associated with dual stage events. As enterprise systems become more complex, however, information associated with such dual stage events for users across an enterprise user base may increase exponentially. Therefore, it may be difficult for the system to efficiently and effectively identify additional events and/or metadata for the various users of the enterprise user base, particularly when also attempting to optimize for resource usage and network bandwidth consumption of the underlying computing infrastructure.

SUMMARY

Aspects of the disclosure provide effective, efficient, scalable, and convenient technical solutions that address and overcome the technical problems associated with using smart data to forecast and track dual stage events.

In accordance with one or more embodiments, a computing platform having at least one processor, a memory, and a communication interface may receive, via the communication interface and from a user device, information indicating a dual stage event corresponding to an item. Thereafter, the computing platform may retrieve, from an external event data source and based on the information indicating the dual stage event, metadata corresponding to the dual stage event. Then, the computing platform may determine, based on the metadata corresponding to the dual stage event, a first value corresponding to the dual stage event. Subsequently, the computing platform may generate, based on the information indicating the dual stage event corresponding to the item, one or more commands directing a smart data server to determine a second value corresponding to the dual stage event. Next, the computing platform may transmit, via the communication interface and to the smart data server, the one or more commands. Then, the computing platform may receive, via the communication interface and from the smart data server, information indicating the second value corresponding to the dual stage event. Also, the computing platform may transmit, via the communication interface and to the user device, a notification indicating the second value corresponding to the dual stage event.

In some embodiments, the computing platform may determine, based on the information indicating the dual stage event, a user profile. Subsequently, the computing platform may retrieve, from the smart data server and based on the user profile, historical information corresponding to the user profile. Then, the second value corresponding to the dual stage event may be based on the historical information corresponding to the user profile. In some embodiments, the second value corresponding to the dual stage event may be based on the historical information corresponding to the user profile.

In some embodiments, the computing platform may determine, based on the information indicating the dual stage event, an item profile. Subsequently, the computing platform may retrieve, from the smart data server and based on the item profile, historical information corresponding to the item. Then, the second value corresponding to the dual stage event may be based on the historical information corresponding to the item. In some embodiments, the historical information corresponding to the item may indicate a plurality of previous historical dual stage events corresponding to the item. In some embodiments, the information indicating the dual stage event corresponding to the item may comprise a scanned item code corresponding to the item.

In some embodiments, the computing platform may determine, based on the information indicating the dual stage event corresponding to the item and the first value corresponding to the dual stage event, one or more alternative item recommendations. Subsequently, the computing platform may transmit, via the communication interface and to the user device, the one or more alternative item recommendations.

In some embodiments, the computing platform may determine, based on the information indicating the dual stage event, a geographic location associated with the dual stage event. Subsequently, the computing platform may determine, based on the geographic location associated with the dual stage event, a quality issue corresponding to the item. Then, the computing platform may transmit, via the communication interface and to the external event data source, the quality issue corresponding to the item.

In some embodiments, the computing platform may receive, via the communication interface and from the external event data source, information indicating a completion of the dual stage event corresponding to the item. Thereafter, the computing platform may transmit, via the communication interface and to the user device, an indication of the completion of the dual stage event corresponding to the item.

In some embodiments, the computing platform may receive, via the communication interface, information indicating an exchange corresponding to a second item, wherein the exchange uses the second value corresponding to the dual stage event. Subsequently, the computing platform may reduce, based on the exchange corresponding to the second item, the second value corresponding to the dual stage event.

In some embodiments, the computing platform may receive, via the communication interface and from the external event data source, information indicating an actual value corresponding to the dual stage event. Subsequently, the computing platform may determine, based on the reducing the second value corresponding to the dual stage event and the actual value corresponding to the dual stage event, an unused value corresponding to the dual stage event. Then, the computing platform may transmit, via the communication interface and to the user device, the unused value corresponding to the dual stage event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
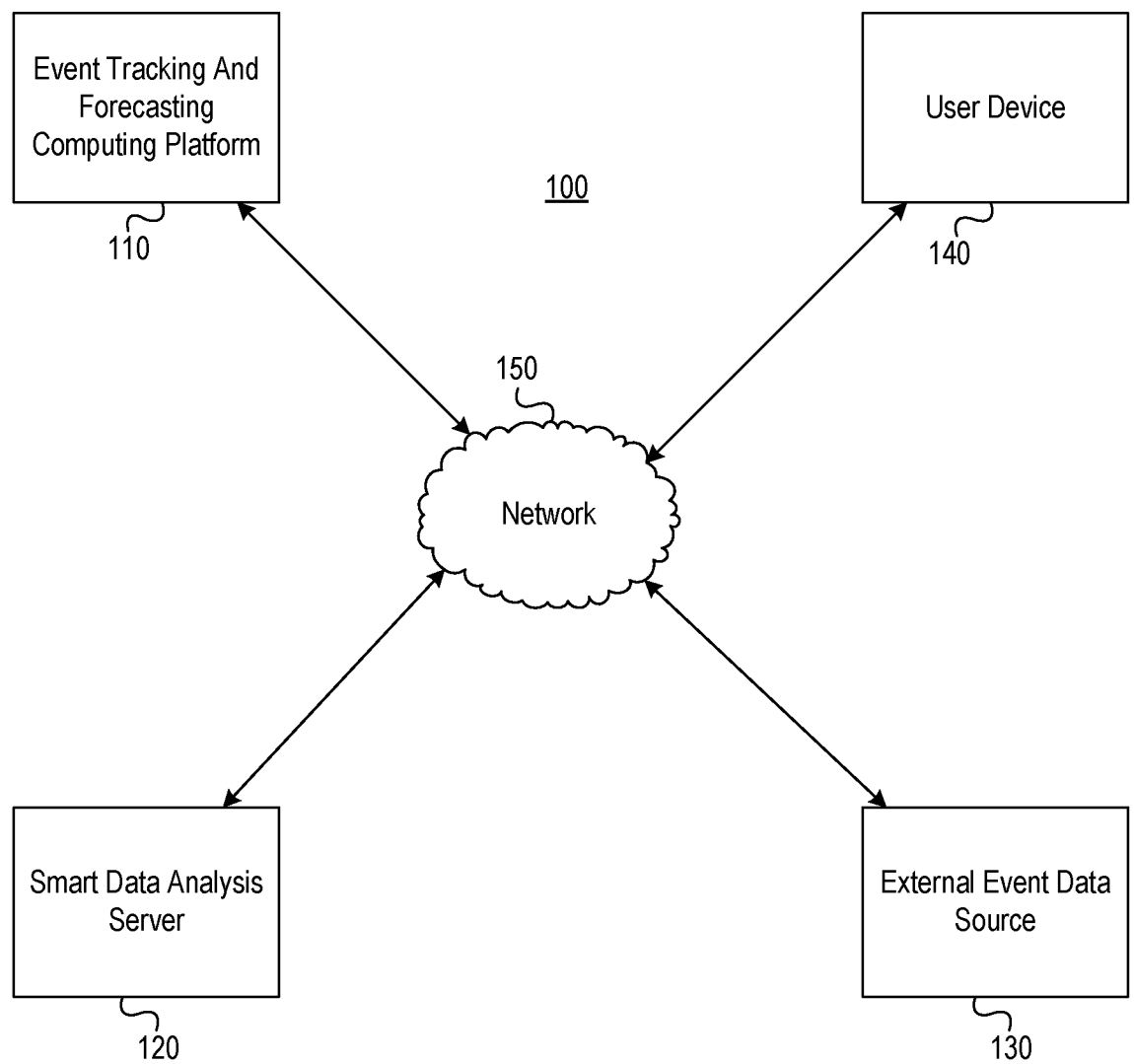
FIGS. 1A and 1B depict an illustrative computing environment for using smart data to forecast and track dual stage events in accordance with one or more example embodiments.
Figure 1B:
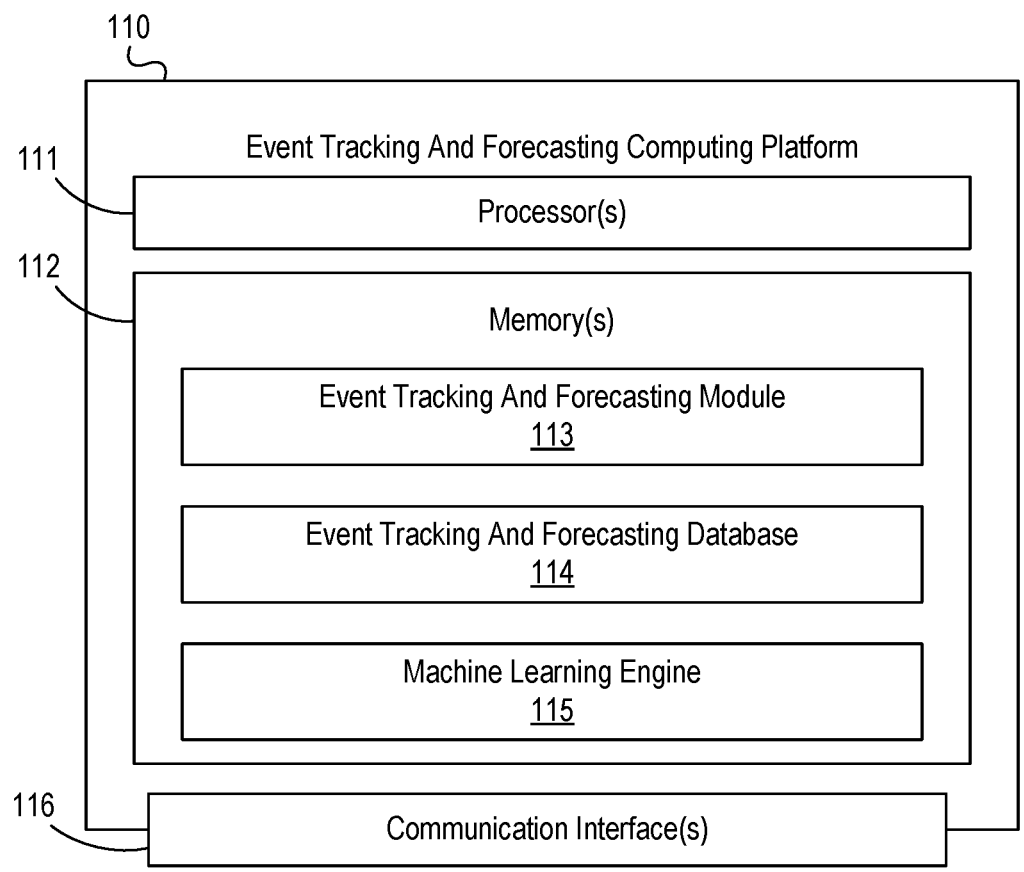

FIGS. 1A and 1B depict an illustrative computing environment for using smart data to forecast and track dual stage events in accordance with one or more example embodiments. Referring to FIG. 1A, computing environment 100 may include one or more computing devices and/or other computer systems. For example, computing environment 100 may include an event tracking and forecasting computing platform 110, a smart data analysis server 120, an external event data source 130, and a user device 140.

Event tracking and forecasting computing platform 110 may be configured to use smart data to forecast and track dual stage events by controlling and/or directing actions of other devices and/or computer systems, and/or perform other functions, as discussed in greater detail below. In some instances, the event tracking and forecasting computing platform 110 may perform and/or provide one or more techniques to use smart data to forecast and/or track dual stage events.

Smart data analysis server 120 may be configured to store, maintain, and/or analyze dual stage event information that may be used to forecast and/or track dual stage events. For example, the smart data analysis server 120 may be configured to store and/or maintain dual stage event information, such as event information corresponding to purchasing, exchanging, returning, and/or refunding items for a plurality of users. In some instances, the smart data analysis server 120 might not be another entity, but the functionalities of the smart data analysis server 120 may be included within the event tracking and forecasting computing platform 110.

External event data source 130 may be a computing system configured to provide event data to the computing environment 100. For example, the external event data source 130 may provide event data corresponding to one or more dual stage events. In some instances, the external event data source 130 may receive and/or monitor one or more dual stage events. In some instances, a dual stage event may correspond to a user or customer of an organization, such as a financial institution, purchasing an item from a merchant (which may, e.g., correspond to a first stage of the event) and subsequently returning the item to the merchant (which may, e.g., correspond to a second stage of the event). In some instances, there may be a delay between when the user or customer returns the item (e.g., because the user or customer may be shipping the item back to a merchant warehouse) and when the merchant receives the item and credits an account of the user or customer (e.g., because of shipping time, weather, or other delays). For example, the external event data source 130 may receive an indication and/or a notification when an item has been returned to a third party. The external event data source 130 may transmit the indication to the event tracking and forecasting computing platform 110 and/or a user device 140. Additionally, and/or alternatively, the external event data source 130 may monitor and/or track the dual stage event. For example, the external event data source 130 may monitor and/or track an item throughout the dual stage event.

User device 140 may be configured to be used by one or more users of computing environment 100. For example, the user device 140 may be configured to display, present, and/or otherwise provide one or more user interfaces that enable users (who may, e.g., be customers of an organization, such as a financial institution) to track and/or monitor one or more dual stage events. The user device 140 may receive, from the one or more users, user input or selections. Further, the user device 140 may send the user input or selections to the event tracking and forecasting computing platform 110 and/or one or more other computer systems and/or devices in computing environment 100. The user device 140 may receive, from the event tracking and forecasting computing platform 110 and/or one or more other computer systems and/or devices in computing environment 100, information or data in response to the user input or selection.

In one or more arrangements, the smart data analysis server 120, the external event data source 130, and/or the user device 140 may be any type of computing device capable of providing a user interface, receiving input via the user interface, and communicating the received input to one or more other computing devices. For example, the smart data analysis server 120, the external event data source 130, and/or the user device 140 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the smart data analysis server 120, the external event data source 130, and/or the user device 140 may, in some instances, be special-purpose computing devices configured to perform specific functions.

Computing environment 100 also may include one or more computing platforms. For example, and as noted above, computing environment 100 may include the event tracking and forecasting computing platform 110. As illustrated in greater detail below, the event tracking and forecasting computing platform 110 may include one or more computing devices configured to perform one or more of the functions described herein. For example, the event tracking and forecasting computing platform 110 may include one or more computers (e.g., laptop computers, desktop computers, servers, server blades, or the like).

Computing environment 100 also may include one or more networks, which may interconnect one or more of the event tracking and forecasting computing platform 110, the smart data analysis server 120, the external event data source 130, and/or the user device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, the event tracking and forecasting computing platform 110, the smart data analysis server 120, the external event data source 130, and/or the user device 140 may be associated with an enterprise organization, and a private sub-network included in network 150 and associated with and/or operated by the organization may include one or more networks (e.g., LANs, WANs, virtual private networks (VPNs), or the like) that interconnect the event tracking and forecasting computing platform 110, the smart data analysis server 120, the external event data source 130, and/or the user device 140. Network 150 also may include a public sub-network that may connect the private sub-network and/or one or more computing devices connected thereto (e.g., the event tracking and forecasting computing platform 110, the smart data analysis server 120, the external event data source 130, and/or the user device 140) with one or more networks and/or computing devices that are not associated with the organization.

Referring to FIG. 1B, the event tracking and forecasting computing platform 110 may include one or more processors 111, memory 112, and communication interface 116. A data bus may interconnect processor(s) 111, memory 112, and communication interface 116. Communication interface 116 may be a network interface configured to support communication between the event tracking and forecasting computing platform 110 and one or more networks (e.g., network 150). Memory 112 may include one or more program modules having instructions that when executed by processor(s) 111 cause the event tracking and forecasting computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the event tracking and forecasting computing platform 110 and/or by different computing devices that may form and/or otherwise make up the event tracking and forecasting computing platform 110. For example, memory 112 may have, store, and/or include an event tracking and forecasting module 113, an event tracking and forecasting database 114, and a machine learning engine 115. The event tracking and forecasting computing platform 110 may include instructions that direct and/or cause the event tracking and forecasting computing platform 110 to use smart data to forecast and track dual stage events, as discussed in greater detail below. The event tracking and forecasting database 114 may store information used by the event tracking and forecasting module 113 and/or the event tracking and forecasting computing platform 110 in using smart data to forecast and track dual stage events, and/or in performing other functions. Machine learning engine 115 may have instructions that direct and/or cause the event tracking and forecasting computing platform 110 to set, define, and/or iteratively redefine optimization rules, techniques and/or other parameters used by the event tracking and forecasting computing platform 110 and/or other systems in computing environment 100.

Figure 2A:
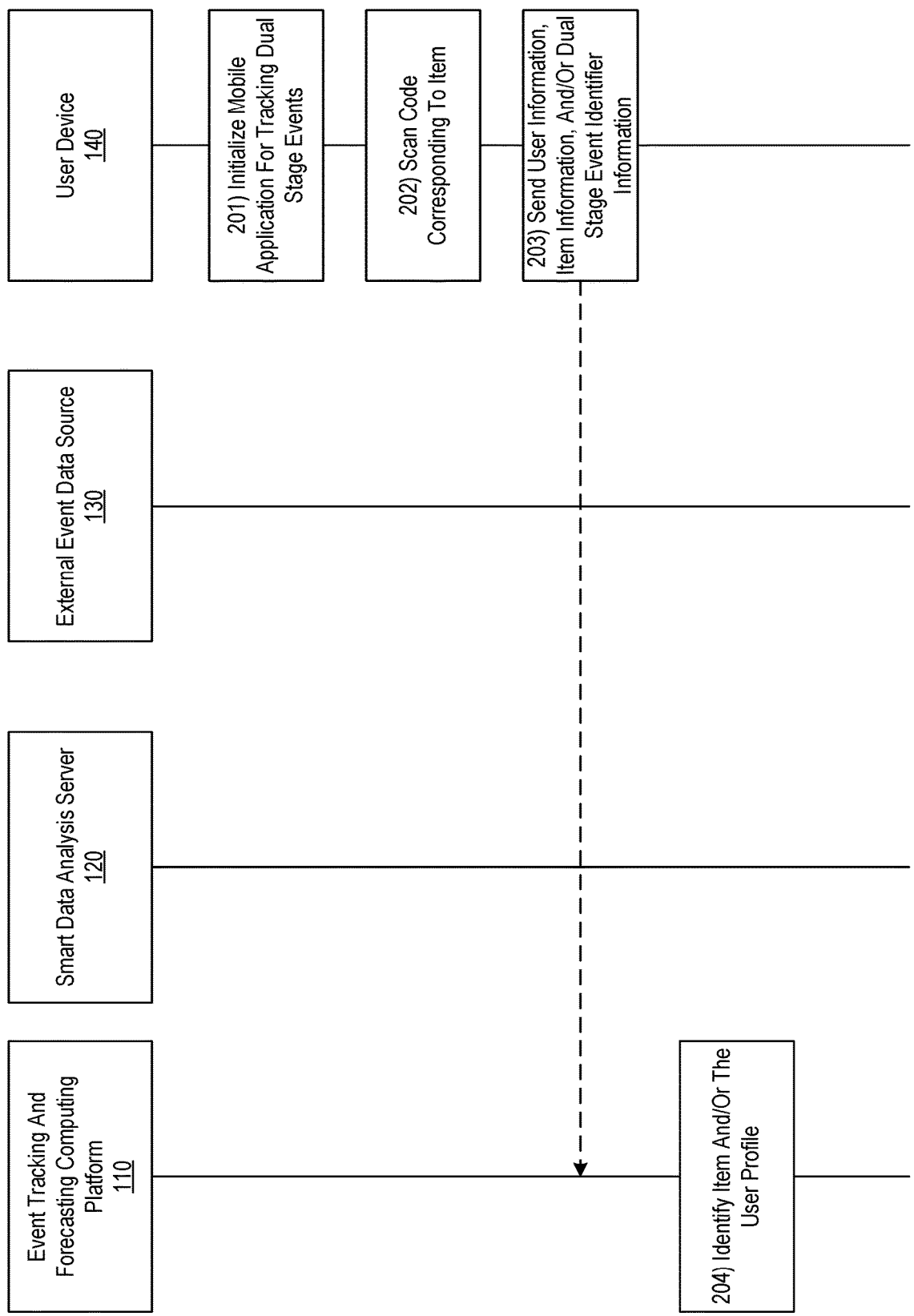
FIGS. 2A, 2B, 2C, 2D, and 2E depict an illustrative event sequence for using smart data to forecast and track dual stage events in accordance with one or more example embodiments.

FIGS. 2A, 2B, 2C, 2D, and 2E depict an illustrative event sequence for using smart data to forecast and track dual stage events in accordance with one or more example embodiments. Referring to FIG. 2A, at step 201, the user device 140 may initialize a mobile application for tracking dual stage events. For example, at step 201, the user device 140 may receive user input indicating a selection of a mobile application. After receiving the user input or selection, the user device 140 may initialize the mobile application. In some instances, after receiving the user input, the user device 140 may initialize a mobile application for tracking dual stage events, such as a mobile application for tracking item purchases and/or returns. For example, a user may purchase an item from a third-party entity, such as a third-party enterprise organization. However, after purchasing the item, the user may decide to return the item back to the third-party enterprise organization. Additionally, and/or alternatively, the user may decide to exchange the item for another item and/or credit. Thus, the user device 140 may initialize a mobile application to track the purchasing, returning, and/or exchanging of the item.

In some examples, the user device 140 may initialize a mobile application for tracking dual stage events corresponding to a web-based interaction. For example, a user device, such as user device 140 or another user device corresponding to a user, may receive input from the user indicating the beginning of a first stage of a dual stage event. The first stage of the dual stage event may include a web-based interaction corresponding to an item, such as an online purchase of an item. After receiving input from the user indicating the purchase of the item, the user device 140 may transmit information indicating the purchase to an external event data source 130. The external event data source 130 may be managed and/or monitored by a third-party enterprise organization, such as a third-party vendor and/or merchant.

The external event data source 130 may receive the information indicating the purchase of the item, and may also transmit updates corresponding to a status of the item. For example, due to the interaction being web-based, the third-party enterprise organization may process the purchase, and may also physically ship the item to an address corresponding to the user device 140 (e.g., a shipping address indicated by the user). During transit from a warehouse corresponding to the third-party enterprise organization to the shipping address, the external event data source 130 may transmit notifications, updates, and/or alerts corresponding to the first stage of the dual stage event. For example, after leaving the warehouse, the external event data source 130 may transmit a notification to the user device 140, such as a notification indicating the item has left the warehouse and is in transit to the user. The external event data source 130 may periodically transmit notifications, updates, and/or alerts to the user device 140 indicating the location of the item as the item is being shipped from the warehouse to the shipping address. Furthermore, the user device 140 may receive, process, and/or display the notifications, updates, and/or alerts.

Figure 3:
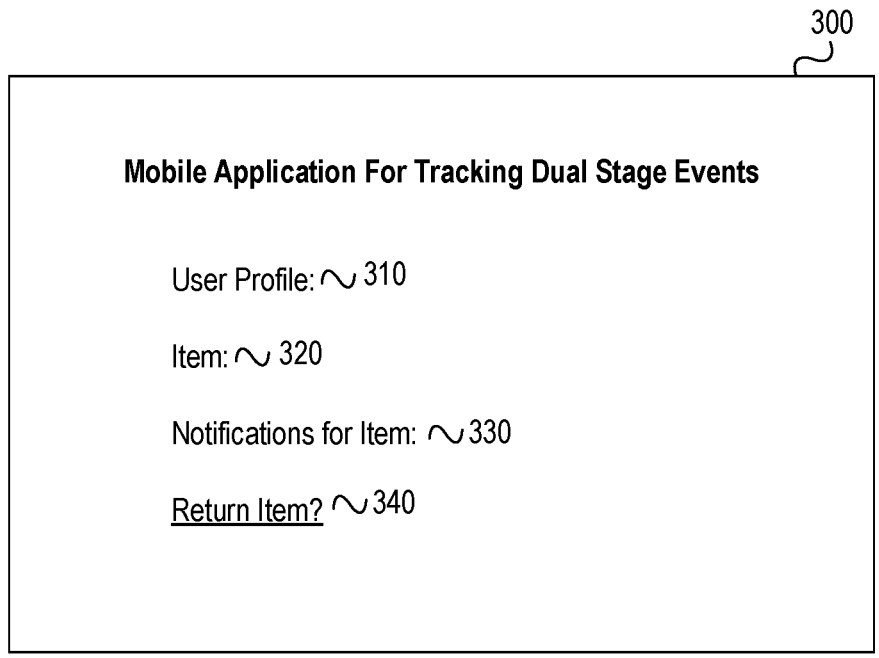
FIGS. 3 and 4 depict example graphical user interfaces for using smart data to forecast and track dual stage events in accordance with one or more example embodiments.

FIG. 3 depicts an example graphical user interface for processing and/or displaying the notifications, updates, and/or alerts for dual stage events. As shown in FIG. 3, graphical user interface 300 may include one or more fields, controls, and/or other elements that may allow a user to determine and/or identify information corresponding to the dual stage event. For example, the graphical user interface 300 may allow a user to view the "User Profile" 310, the "Item" 320, and/or "Notifications for the Item" 330. The "User Profile" 310 may display a profile and/or an account for the user initiating the dual stage event. For example, the "User Profile" 310 may indicate a profile and/or account that purchased the item. The "Item" 320 may indicate an item corresponding to the dual stage event, such as an item purchased by the user. Furthermore, in some embodiments, the "Item" 320 may also indicate an identifier, such as a dual stage identifier, corresponding to the dual stage event. The "Notifications for the Item" 330 may indicate notifications, updates, and/or alerts for the dual stage event, such as notifications, updates, and/or alerts corresponding to the transit of the item from the warehouse to the shipping address. In some embodiments, the user device 140 may receive additional and/or new notifications, updates, and/or alerts for the dual stage event. Further, the user device 140 may display alongside and/or replace previous notifications, updates, and/or alerts with the additional and/or new notifications, updates, and/or alerts. Additionally, and/or alternatively, the graphical user interface 300 may include one or more links, such as a "Return Item?" link 340. As explained in further detail below, the "Return Item?" link 340 may allow a user to receive credit or a refund for a returned item.

At step 202, the user device 140 may scan a code corresponding to the item. For example, after the user device 140 initializes the mobile application for tracking dual stage events at step 201, the user device 140 may use the mobile application to scan a code corresponding to the item. In some instances, the user device 140 may scan the code corresponding to the item after completion of the first stage of the dual stage event. For instance, as explained above, the user device 140 may receive notifications, updates, and/or alerts as the item is in transit from the warehouse corresponding to the third-party enterprise organization to the shipping address indicated by the user. After reaching the shipping address, the external event data source 130 may transmit a notification indicating completion of the first stage of the dual stage event (e.g., the item has been delivered to the user). The user device 140 may receive and/or display the notification indicating the completion of the first stage of the dual stage event.

After displaying the notification indicating the completion of the first stage of the dual stage event, the user device 140 may initialize the second stage of the dual stage event by scanning a code corresponding to the item. For example, after the user receives the item, the user may decide to return and/or exchange the item. The user device 140 may receive user input indicating that the user is returning and/or exchanging the item. For instance, referring to FIG. 3, the user device 140 may receive user input indicating a selection of the "return item?" link 340. After receiving the user input, the user device 140 may initialize the mobile application to scan a code corresponding to the item. The user device 140 and/or additional computing devices and/or platforms in computing environment 100 may use the scanned code to identify the item.

In some examples, the item may include a tag, such as an electronic tag or an electronic radio-frequency identification (RFID) tag. The user device 140 may scan the tag (e.g., the RFID tag) for the item. The user device 140 may use the tag to identify the item and/or an identifier (e.g., a dual stage identifier) corresponding to the item. Additionally, and/or alternatively, the item may include a code, such as a barcode, corresponding to the item. Based on the user device 140 scanning the barcode, the user device 140 may identify the item and/or identifier corresponding to the item.

At step 203, the user device 140 may send user information, item information, and/or dual stage event identifier information to the event tracking and forecasting computing platform 110. For example, the user device 140 may send user information, such as information indicating the user profile corresponding to the dual stage event, to the event tracking and forecasting computing platform 110. Further, the user device 140 may send item information, such as information indicating the item and/or the scanned code corresponding to the item, to the event tracking and forecasting computing platform 110. Additionally, the user device 140 may send dual stage event identifier information, such as the transaction identifier corresponding to the item, the notifications for the item, and/or other information corresponding to the dual stage event, to the event tracking and forecasting computing platform 110. In some embodiments, the transaction identifier may identify a transaction for the dual stage event. For example, the dual stage event may include a purchase of one or more items. The transaction identifier may identify the purchase or exchange of the one or more items between the third-party enterprise organization and the user.

At step 204, the event tracking and forecasting computing platform 110 may identify the item and/or the user profile. For example, after receiving the user information and/or the item information from the user device 140, the event tracking and forecasting computing platform 110 may identify the item and/or the user profile corresponding to the dual stage event.

In some instances, the event tracking and forecasting computing platform 110 may identify the item and/or the user profile corresponding to a web-based dual stage event. For instance, as mentioned previously, the user may seek to return and/or exchange an item after purchasing the item via a web-based interaction (e.g., a web-based transaction). The event tracking and forecasting computing platform 110 may use the item information, such as the scanned code corresponding to the item, to identify the item to be returned and/or exchanged. Additionally, and/or alternatively, the event tracking and forecasting computing platform 110 may use the user information to identify the user profile and/or the user that purchased the item.

Figure 2B:
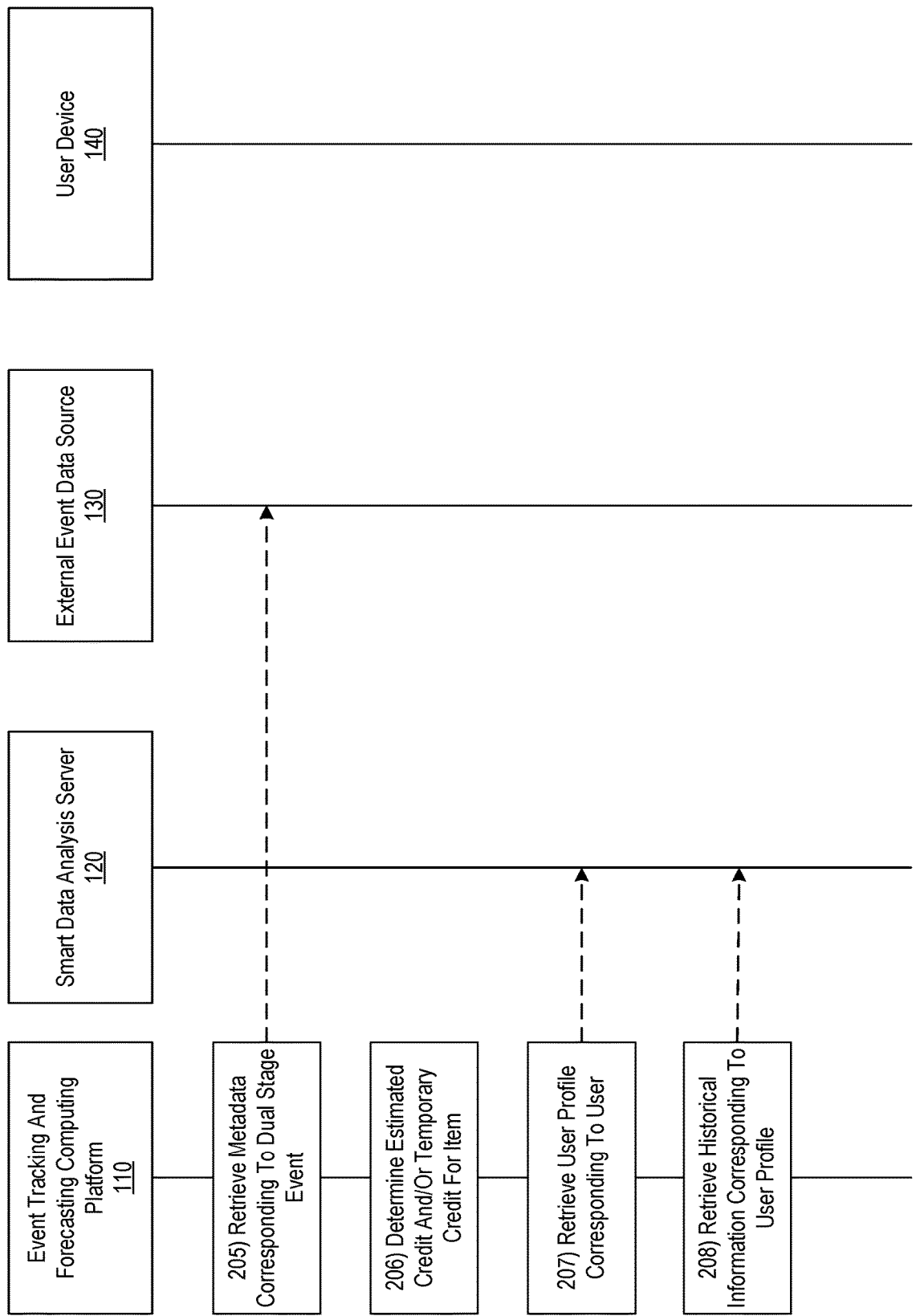

Referring to FIG. 2B, at step 205, the event tracking and forecasting computing platform 110 may retrieve metadata corresponding to the dual stage event. For example, based on the identified item, the identified user profile, user information, the item information, and/or the dual stage event identifier information, the event tracking and forecasting computing platform 110 may determine and/or retrieve metadata corresponding to the dual stage event from the external event data source 130.

In some examples, the metadata corresponding to the dual stage event may be metadata corresponding to the web-based interaction. For example, the user device 140 may transmit information to the external event data source 130 indicating a web-based transaction of one or more items. Then, the user device 140 may receive user input (e.g., a selection of the "Return Item?" link 340) indicating a return of one or more items. For instance, a user may purchase a washing machine, a dryer, and a microwave. However, the user may wish to return and/or exchange the washing machine and may also wish to keep the dryer and microwave. The event tracking and forecasting computing platform 110 may use the transaction identifier and/or other information to retrieve information for the transaction, such as information corresponding to the purchase of the washing machine, dryer, and microwave. In some embodiments, the event tracking and forecasting computing platform 110 may retrieve additional information corresponding to the transaction, such as a value for the one or more items. For example, the event tracking and forecasting computing platform 110 may retrieve the value of the washing machine, dryer, microwave, and/or the total value of the transaction (e.g., the total value for the washing machine, dryer, and microwave). Further, in some instances, the event tracking and forecasting computing platform 110 may retrieve a payment method, such as a cash payment or a check payment, for the transaction.

In some embodiments, the external event data source 130 may be a web-based search engine. The event tracking and forecasting computing platform 110 may retrieve the metadata corresponding to the dual stage event from the web-based search engine. For example, the user may seek to return and/or exchange the washing machine from a transaction that includes the washing machine, dryer, and microwave. The event tracking and forecasting computing platform 110 may search for and retrieve a value for the washing machine, the dryer, and/or the microwave from the web-based search engine. Additionally, and/or alternatively, the event tracking and forecasting computing platform 110 may determine similar items to the washing machine. For example, the event tracking and forecasting computing platform 110 may use the web-based search engine to determine washing machines with similar capabilities to the washing machine purchased by the user. Furthermore, the event tracking and forecasting computing platform 110 may retrieve values for washing machines with similar capabilities and/or characteristics to the washing machine purchased by the user. And, as explained in further detail below, the event tracking and forecasting computing platform 110 may use the values for the similar washing machines in determining an estimated credit for the washing machine (e.g., an estimated value to be returned to the user if the washing machine was to be returned).

In some instances, the event tracking and forecasting computing platform 110 may retrieve metadata comprising policies corresponding to the dual stage event. For example, the user may have purchased the item from an external event data source 130, such as a third-party enterprise organization. The third-party enterprise organization may include policies, such as additional charges, when a user returns and/or exchanges the item. For example, the third-party enterprise organization may include additional charges, such as a restocking fee and/or other fees corresponding to the return of the item. The event tracking and forecasting computing platform 110 may retrieve, from the external event data source 130, metadata that includes the policies (e.g., restocking fees) for the third-party enterprise organization corresponding to the dual stage event.

At step 206, the event tracking and forecasting computing platform 110 may determine an estimated credit and/or a temporary credit for the item. For example, based on the item, the dual stage event identifier, and/or the metadata retrieved at step 205, the event tracking and forecasting computing platform 110 may determine an estimated credit for the item. In some instances, the event tracking and forecasting computing platform 110 may determine the estimated credit as an estimated value that the user expects to receive after the user returns the item to the third-party enterprise organization. For example, the user may have purchased a winter coat, a pair of jeans, and two shirts from the third-party enterprise organization. Further, the user may seek to return and/or exchange the winter coat. Thus, the event tracking and forecasting computing platform 110 may determine the estimated credit (e.g., estimated value) that may be refunded to the user after returning the winter coat. For instance, using the metadata retrieved at step 205, the event tracking and forecasting computing platform 110 may determine the item (e.g., the winter coat) was purchased for $200. Therefore, the event tracking and forecasting computing platform 110 may determine the estimated credit that may be refunded to the user may be $200. Additionally, and/or alternatively, the event tracking and forecasting computing platform 110 may retrieve policies (e.g., restocking fees) corresponding to the dual stage event. For example, the policies may include a $25 restocking fee and/or a $25 return shipping fee (e.g., a shipping fee to return the winter coat). Thus, the event tracking and forecasting computing platform 110 may determine the estimated credit that may be refunded to the user for the winter coat is $150.

In some examples, the event tracking and forecasting computing platform 110 may determine a temporary credit for the item. For example, prior to the item being returned to the third-party enterprise organization (e.g., a third-party vendor and/or merchant), the event tracking and forecasting computing platform 110 may determine and/or authorize temporary credit that the user may use for another transaction. For instance, a user may have purchased a winter coat, but may seek to return and/or exchange the winter coat for another item, such as a winter jacket. Prior to the user re-packaging, returning, and/or exchanging the winter coat, the event tracking and forecasting computing platform 110 may determine a temporary credit that the user may use to purchase the winter jacket. In some embodiments, the event tracking and forecasting computing platform 110 may determine the temporary credit based on the calculated estimated credit. For example, the event tracking and forecasting computing platform 110 may determine that the temporary credit for the winter coat may the same as the estimated credit for winter coat (e.g., $150). Additionally, and/or alternatively, as explained below, the event tracking and forecasting computing platform 110 may change the temporary credit based on other factors, such as the user profile, the item profile, and/or the external event data source profile.

After determining the temporary credit and as explained in further detail below, the event tracking and forecasting computing platform 110 may send a notification to the user device 140 indicating the temporary credit (e.g., $150). The user may view temporary credit prior to re-packaging, returning, and/or exchanging the winter coat. If the user decides to return and/or exchange the winter coat, the user device 140 may receive a user input indicating the return of the winter coat and may transmit information indicating proof of the return to the event tracking and forecasting computing platform 110. For example, the user device 140 may receive and/or transmit a picture and/or a scanned code indicating the winter coat is being shipped back to the third-party enterprise organization. After receiving the information indicating the proof of the return, the event tracking and forecasting computing platform 110 may authorize the temporary credit (e.g., $150) to the user profile and/or user. Thus, prior to the third-party enterprise organization refunding the user for the return of the winter coat, the event tracking and forecasting computing platform 110 may authorize temporary credit (e.g., $150) for the user to purchase another item, such as a winter jacket.

At step 207, the event tracking and forecasting computing platform 110 may retrieve a user profile corresponding to the user. For example, the event tracking and forecasting computing platform 110 may retrieve a user profile from the smart data analysis server 120. In some instances, after identifying the user profile at step 204, the event tracking and forecasting computing platform 110 may retrieve the identified user profile from the smart data analysis server 120. In some embodiments, the user profile may indicate one or more characteristics corresponding to the user. The characteristics may include demographic information. For example, the event tracking and forecasting computing platform 110 may retrieve a user profile indicating a recent college graduate. The event tracking and forecasting computing platform 110 may use the user profile to determine whether to change the value of the temporary credit.

At step 208, the event tracking and forecasting computing platform 110 may retrieve historical information corresponding to the user profile. For example, the event tracking and forecasting computing platform 110 may retrieve historical information corresponding to the retrieved user profile from the smart data analysis server 120. In some examples, the historical information may include previous dual stage events (e.g., previous transactions) for the user. For example, the event tracking and forecasting computing platform 110 may retrieve historical information indicating that the user previously purchased a house. Additionally, and/or alternatively, the event tracking and forecasting computing platform 110 may retrieve historical information indicating previous dual stage events, such as the user previously returned and/or exchanged a pair of socks and a pair of jeans.

In some embodiments, the event tracking and forecasting computing platform 110 may use the historical information to determine whether to change the value of the temporary credit. For example, the user profile may indicate that the user has already returned and/or exchanged a number of items within a time threshold, such as within the last week. Thus, based on the number of returns and/or exchanged items, the event tracking and forecasting computing platform 110 may reduce the temporary credit by a certain amount and/or by a percentage. For instance, after one returned item, the event tracking and forecasting computing platform 110 may reduce the temporary credit by $20. After two returned items, the event tracking and forecasting computing platform 110 may reduce the temporary credit by $40.

Figure 2C:
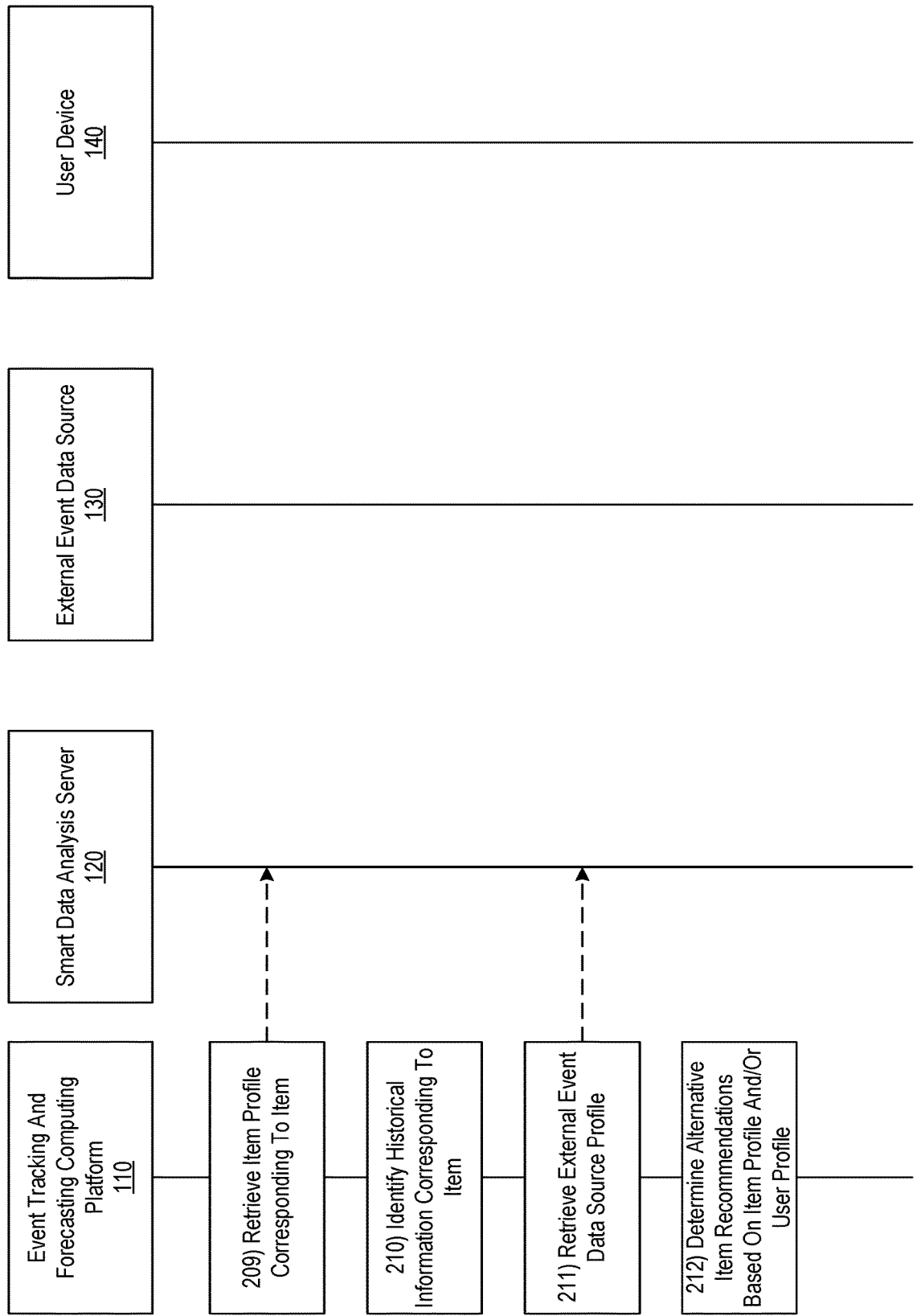

Referring to FIG. 2C, at step 209, the event tracking and forecasting computing platform 110 may retrieve an item profile corresponding to the item. For example, the event tracking and forecasting computing platform 110 may retrieve an item profile from the smart data analysis server 120. In some instances, the event tracking and forecasting computing platform 110 may retrieve an item profile that defines attributes corresponding to the item. For example, the item profile may indicate a class for the item, a type of the item, a brand that made and/or sold the item, and/or a model of the item. For instance, the class corresponding to the winter coat may be a winter accessory. The type of the winter coat may be winter coats. The brand that made and/or sold the winter coat may be the third-party enterprise organization that made and/or sold the winter coat. The model of the winter coat may be a unique model number, such as a serial number, identification number, and/or stock keeping unit (SKU) code, for the winter coat.

At step 210, the event tracking and forecasting computing platform 110 may identify historical information corresponding to the item profile. For example, after retrieving the item profile from the smart data analysis server 120 at step 209, the event tracking and forecasting computing platform 110 may identify historical information corresponding to the retrieved item profile. The historical information corresponding to the item profile may be from a plurality of different users (e.g., a plurality of different users that may have returned and/or exchanged the item and/or similar items).

In some instances, the historical information may include previous dual stage events corresponding to the item profile. For example, the event tracking and forecasting computing platform 110 may identify previous returns and/or exchanges for the class for the item, the type of the item, the brand that made and/or sold the item, and/or the model of the item. For instance, as mentioned previously, the item may be a winter coat. The event tracking and forecasting computing platform 110 may identify previous returns and/or exchanges for the model of the item (e.g., previous returns and/or exchanges for the particular model of the winter coat that the user purchased).

Additionally, and/or alternatively, the event tracking and forecasting computing platform 110 may use the historical information corresponding to the item profile to determine whether to change the value of the temporary credit. For example, based on the number of previous returns and/or exchanges corresponding to the item profile (e.g., the class for the item, the type of the item, the brand that made and/or sold the item, and/or the model of the item), the event tracking and forecasting computing platform 110 may change the value of the temporary credit. For instance, the event tracking and forecasting computing platform 110 may authorize a full refund (e.g., $150) for the winter coat if the number of previous returns and/or exchanges for the same SKU of winter coats satisfies a pre-determined threshold, such as two hundred returns. However, the event tracking and forecasting computing platform 110 might not authorize a full refund (e.g., $150), but may lower the value of the refund by a percentage and/or number (e.g., $20) if the number of previous returns and/or exchanges for the same SKU of winter coats satisfies a second pre-determined threshold, such as a hundred returns. Further, the event tracking and forecasting computing platform 110 might not authorize any refund if the number of previous returns and/or exchanges for the same SKU of winter coats is below a third pre-determined threshold, such as fifty returns.

In some examples, the event tracking and forecasting computing platform 110 may identify and/or sort historical information based on geographic location. For example, the event tracking and forecasting computing platform 110 may determine that winter coats are being returned and/or exchanged in a warmer part of the US, such as Atlanta, more frequently than in a colder part of the US, such as Chicago. Additionally, the event tracking and forecasting computing platform 110 may determine trends based on the geographic location and the historical information. For example, winter coats being shipped from a warehouse close to Atlanta may be defective whereas winter coats being shipped from a warehouse close to Chicago might not be defective. As such, the event tracking and forecasting computing platform 110 may receive increased requests for temporary credit from users in Atlanta versus users in Chicago. After the requests for temporary credit from a geographic location reach a certain threshold, the event tracking and forecasting computing platform 110 may determine that the item being shipped is defective. Additionally, and/or alternatively, the event tracking and forecasting computing platform 110 may use the determination that the item being shipped is defective to authorize and/or change the temporary credit amount for the item. For example, for Atlanta users, the event tracking and forecasting computing platform 110 may authorize the full temporary credit amount (e.g., $150) for users seeking a return and/or exchange of the winter coat. However, for Chicago users, the event tracking and forecasting computing platform 110 might not authorize and/or refund the full temporary credit amount (e.g., $150) for users seeking a return and/or exchange of the winter coat.

At step 211, the event tracking and forecasting computing platform 110 may retrieve an external event data source profile. For example, the event tracking and forecasting computing platform 110 may retrieve an external event data source profile from the smart data analysis server 120. In some embodiments, the event tracking and forecasting computing platform 110 may use the external event data source profile to determine whether to change the value of the temporary credit. For example, the external event data source profile may indicate a third-party vendor and/or merchant that sold the item (e.g., the winter coat). Additionally, and/or alternatively, the external event data source profile may indicate a plurality of previous dual stage events (e.g., previous returns and/or exchanges) for the third-party vendor and/or merchant. Based on the number of previous dual stage events for the third-party vendor and/or merchant, the event tracking and forecasting computing platform 110 may determine whether to change the value of the temporary credit. For instance, the event tracking and forecasting computing platform 110 may authorize a full refund (e.g., $150) for the winter coat if the number of previous returns and/or exchanges for the third-party vendor and/or merchant satisfies a pre-determined threshold, such as two hundred returns. However, the event tracking and forecasting computing platform 110 might not authorize a full refund (e.g., $150), but may lower the value of the refund by a percentage and/or number (e.g., $20) if the number of previous returns and/or exchanges for the third-party vendor and/or merchant satisfies a second pre-determined threshold, such as a hundred returns. Further, the event tracking and forecasting computing platform 110 might not authorize any refund if the number of previous returns and/or exchanges for the third-party vendor and/or merchant is below a third pre-determined threshold, such as fifty returns.

At step 212, the event tracking and forecasting computing platform 110 may determine alternative item recommendations based on the item profile and/or the user profile. For example, at step 207, the event tracking and forecasting computing platform 110 may retrieve a user profile corresponding to the user. The user profile may indicate demographic factors or information. Based on the demographic factors, the event tracking and forecasting computing platform 110 may filter and/or determine alternative item recommendations for the item. For instance, a male user may have accidently purchased a female's winter coat. The male user may wish to return the winter coat back to the third-party enterprise organization. The event tracking and forecasting computing platform 110 may use the user profile (e.g., the gender and/or income level) and/or the item profile (e.g., same brand as the female's winter coat) to determine one or more alternative winter coat recommendations for the male user. Additionally, and/or alternatively, in some instances, a user with a large family may purchase a washing machine that is capable of doing only a small load of laundry. The user may seek to return and/or exchange the washing machine for a different model that is capable of doing larger loads of laundry. The event tracking and forecasting computing platform 110 may determine, from the user profile, the size of the user's family and/or the marital status of the user. Then, the event tracking and forecasting computing platform 110 may determine alternative washing machine recommendations to accommodate for the user's family size.

In some examples, the event tracking and forecasting computing platform 110 may determine alternative item recommendations based on the temporary credit. For example, the event tracking and forecasting computing platform 110 may determine the temporary credit for a return of a winter coat is $150. Based on the user profile and/or item profile, the event tracking and forecasting computing platform 110 may determine a plurality of alternative item recommendations for the winter coat. Additionally, and/or alternatively, the event tracking and forecasting computing platform 110 may determine and/or filter the plurality of alternative item recommendations based on the temporary credit. For instance, the event tracking and forecasting computing platform 110 may determine a subset of the plurality of alternative item recommendations that are under, around, and/or above the $150 threshold.

Figure 2D:
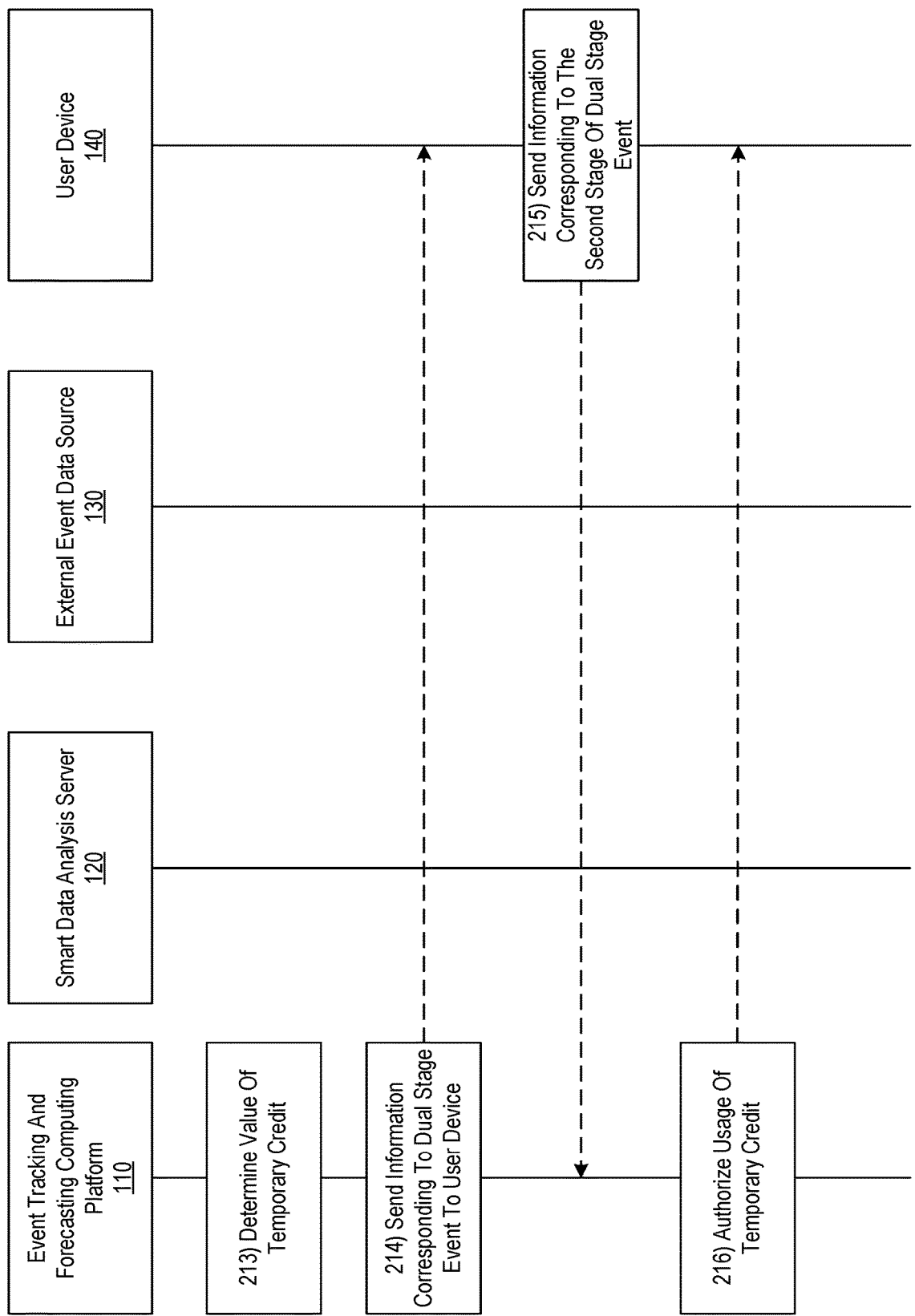

Referring to FIG. 2D, at step 213, the event tracking and forecasting computing platform 110 may determine a value of the temporary credit. For example, referring back to step 206, the event tracking and forecasting computing platform 110 may determine a temporary credit for the item. Then, referring back to steps 207 through 212, the event tracking and forecasting computing platform 110 may change (e.g., reducing and/or increasing) the temporary credit for the item. At step 213, the event tracking and forecasting computing platform 110 may determine a final value of the temporary credit for the item.

Additionally, and/or alternatively, the event tracking and forecasting computing platform 110 may generate one or more commands directing the smart data analysis server 120 to determine a value of the temporary credit. The smart data analysis server 120 may receive the one or more commands. Then, using the user profile, item profile, estimated credit, historical information corresponding to the user profile and/or item profile, external event data source profile, and/or other factors described above, the smart data analysis server 120 may determine a value of the temporary credit. Afterwards, the smart data analysis server 120 may transmit value of the temporary credit to the event tracking and forecasting computing platform 110.

At step 214, the event tracking and forecasting computing platform 110 may send information corresponding to the dual stage event to the user device 140. For example, the event tracking and forecasting computing platform 110 may send information indicating the second stage of the dual stage event to the user device 140. The information may include an estimated credit for the item, alternative item recommendations, and/or authorization of temporary credit. After receiving the information, the user device 140 may display the information indicating the second stage of the dual stage event.

Figure 4:
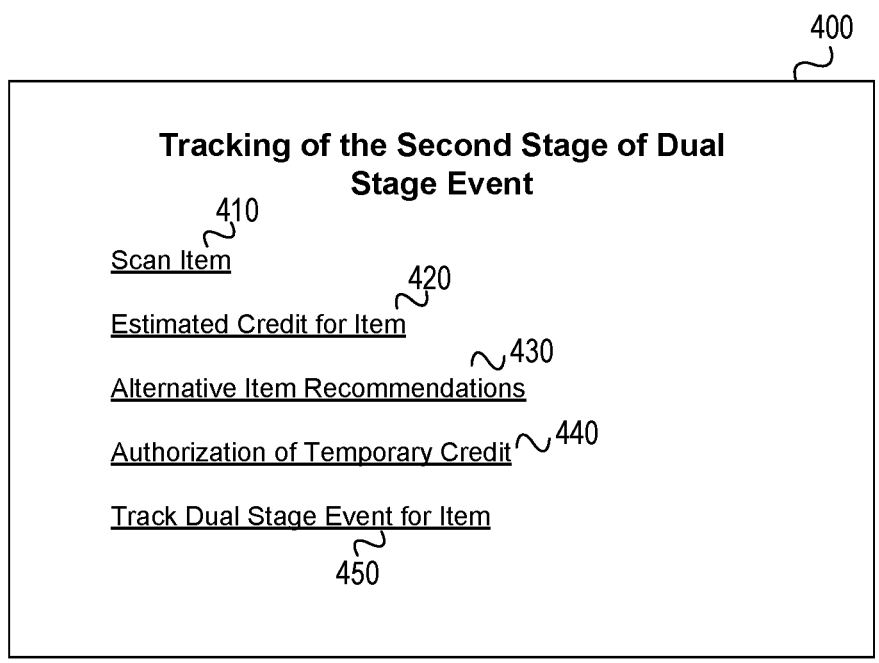

FIG. 4 depicts an example graphical user interface for tracking of the second stage of the dual stage event. As shown in FIG. 4, graphical user interface 400 may include one or more fields, controls, and/or other elements that may allow a user to determine, view, and/or identify information corresponding to the second stage of the dual stage event. For example, the graphical user interface 400 may include one or more links, such as a "Scan Item" link 410, an "Estimated Credit for Item" link 420, an "Alternative Item Recommendations" link 430, an "Authorization of Temporary Credit" link 440, and/or a "Track Dual Stage Event for Item" link 450.

In some instances, the user device 140 may receive a user selection of the "Scan Item" link 410. After receiving the user selection of the "Scan Item" link 410, the user device 140 may scan an item corresponding to the dual stage event. For example, referring back to step 202, the user device 140 may scan a code corresponding to the item.

In some examples, the user device 140 may receive a user selection of the "Estimated Credit for Item" link 420. After receiving the user selection of the "Estimated Credit for Item" link 420, the user device 140 may display the estimated credit for the item. For example, referring back to step 206, the event tracking and forecasting computing platform 110 may determine an estimated credit for the item, such as estimated credit for the winter coat. Then, at step 214, the event tracking and forecasting computing platform 110 may send the information indicating the estimated credit for the item to the user device 140. After receiving the information and/or receiving the user selection, the user device 140 may display the estimated credit for the item.

In some embodiments, the user device 140 may receive a user selection of the "Alternative Item Recommendations" link 430. After receiving the user selection of the "Alternative Item Recommendations" link 430, the user device 140 may display alternative item recommendations. For example, referring back to step 212, the event tracking and forecasting computing platform 110 may determine one or more alternative item recommendations corresponding to the item. Then, at step 214, the event tracking and forecasting computing platform 110 may send the information indicating the alternative item recommendations to the user device 140. After receiving the information and/or receiving the user selection, the user device 140 may display the alternative item recommendations.

In some instances, the user device 140 may receive a user selection of the "Authorization of Temporary Credit" link 440. After receiving the user selection of the "Authorization of Temporary Credit" link 440, the user device 140 may display the value of the temporary credit for the item. For example, referring back to step 213, the event tracking and forecasting computing platform 110 may determine a final value of the temporary credit. Then, at step 214, the event tracking and forecasting computing platform 110 may send the information indicating the temporary credit for the item to the user device 140. After receiving the information and/or receiving the user selection, the user device 140 may display the temporary credit for the item.

In some examples, the user device 140 may receive a user selection of the "Track Dual Stage Event for Item" link 450. For example, after the user device 140 displays the value of the temporary credit, the user may decide to return and/or exchange the item. Thus, the user device 140 may receive a user selection of the "Track Dual Stage Event for Item" link 450. After receiving the user selection, the user device 140 may prompt the user for proof of the return. For example, the user device 140 may prompt the user to take a picture of the item and/or scan a code for the item. After receiving the picture and/or code and as explained below at step 215, the user device 140 may transmit information corresponding to the proof of the return of the item to the event tracking and forecasting computing platform 110.

At step 215, the user device 140 may send information corresponding to the second stage of the dual stage event. For example, referring back to FIG. 4, after receiving the user selection of the "track dual stage event for item" link 450, the user device 140 may prompt the user for proof of the return. After receiving information corresponding to the proof of the return, the user device 140 may send the information to the event tracking and forecasting computing platform 110. In some instances, the information may comprise a picture and/or a code corresponding to the item.

At step 216, the event tracking and forecasting computing platform 110 may authorize usage of the temporary credit. For example, after receiving information corresponding to the second stage of the dual stage event at step 215, the event tracking and forecasting computing platform 110 may authorize usage of the temporary credit. For instance, the event tracking and forecasting computing platform 110 may first validate the information corresponding to the second stage of the dual stage event (e.g., validate the proof of the return of the item). Then, based on validating the information, the event tracking and forecasting computing platform 110 may authorize usage of the temporary credit. Afterwards, the event tracking and forecasting computing platform 110 may transmit a notification to the user device 140 indicating that the temporary credit has been authorized. Thus, before the third-party enterprise organization receives the item back from the user, the user device 140 may receive user input indicating a purchase of a different item using the temporary credit. For instance, the user may purchase a different winter coat for $100. After receiving information indicating the purchase of the different winter coat, the event tracking and forecasting computing platform 110 may reduce the temporary credit from $150 (e.g., the temporary credit for the winter coat) to $50 (e.g., the new temporary credit).

Figure 2E:
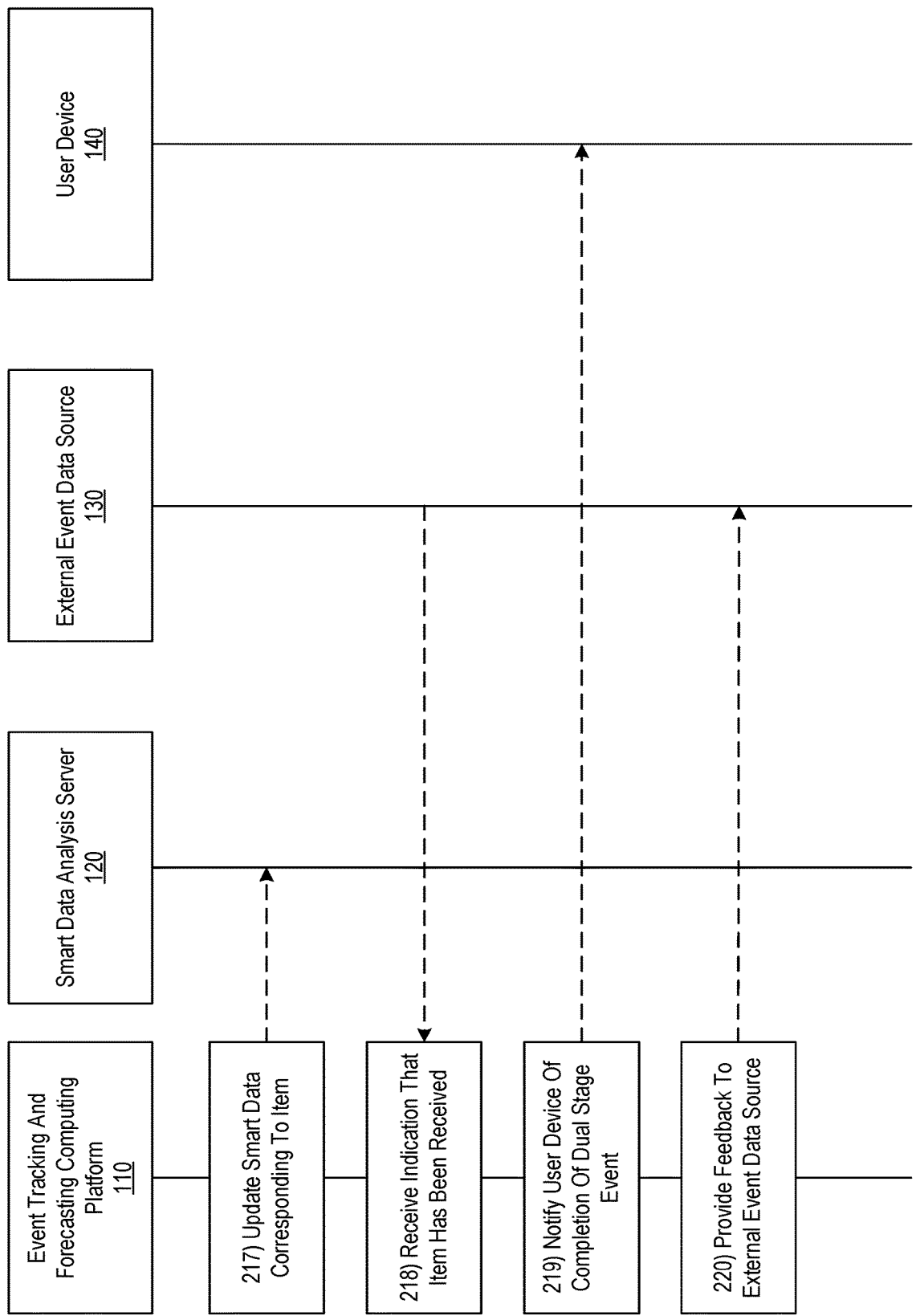

Referring to FIG. 2E, at step 217, the event tracking and forecasting computing platform 110 may update the smart data corresponding to the item. For example, the event tracking and forecasting computing platform 110 may update the smart data, such as the user profile, item profile, historical information corresponding to the user profile, and/or the historical information corresponding to the item profile. Therefore, in another iteration of the process (e.g., if the user and/or a different user returns and/or exchanges another item), the event tracking and forecasting computing platform 110 may use the updated smart data to determine the estimated credit, the temporary credit, and/or alternative item recommendations as explained above.

At step 218, the event tracking and forecasting computing platform 110 may receive an indication that the item has been received from the external event data source 130. For example, the external event data source 130 (e.g., the third-party enterprise organization) may receive the item, such as the winter coat, back from the user. After receiving the item, the external event data source 130 may send a notification to the event tracking and forecasting computing platform 110. The notification may indicate that the item has been received by the external event data source 130. Additionally, and/or alternatively, the third-party enterprise organization may credit and/or refund the user for the item, such as the winter coat. Thus, the external event data source 130 may also send information indicating a credit and/or refund for the item, such as the winter coat.

In some instances, the external event data source 130 may transmit updates corresponding to a status of the item as the item is in transit back to the third-party enterprise organization. For example, due to the interaction being web-based, the user may ship the item back to the third-party enterprise organization. During transit back to the third-party enterprise organization, the external event data source 130 may transmit notifications, updates, and/or alerts for the item as it is being returned to the third-party enterprise organization. The user device 140 may receive, process, and/or display the notifications, updates, and/or alerts. Further, referring to FIG. 3, the user device 140 may display the notifications, updates, and/or alerts for the item in the "Notifications for Item" field 330.

At step 219, the event tracking and forecasting computing platform 110 may notify the user device 140 of the completion of the dual stage event. For example, after receiving indication that the item has been received at step 218, the event tracking and forecasting computing platform 110 may send a notification to the user device 140 of the completion of the dual stage event (e.g., the item has been returned to the third-party enterprise organization). Additionally, and/or alternatively, the third-party enterprise organization may credit and/or refund the user for the item, such as the winter coat. However, the actual credit for the item may be different from the estimated credit. For example, the user may have returned a winter coat that is valued at $200. Due to policies, such as a restocking fee and/or a return shipping fee, the event tracking and forecasting computing platform 110 may determine the estimated credit for the item is $150. However, the third-party enterprise organization may waive the restocking fee and/or the return shipping fee. Thus, the actual credit may be different than the estimated credit. For instance, the actual credit may be $175. The event tracking and forecasting computing platform 110 may send a notification to the user device 140 indicating the actual credit of the winter coat (e.g., $175).

In some instances, the event tracking and forecasting computing platform 110 may authorize temporary credit for the item. For example, the event tracking and forecasting computing platform 110 may authorize a temporary credit for the item, such as a temporary credit of $150 for the winter coat. The user may use the temporary credit to purchase a second item, such as a winter jacket, for $100. Thus, the event tracking and forecasting computing platform 110 may reduce the temporary credit to $50. After returning the winter coat, the event tracking and forecasting computing platform 110 may receive an indication that the actual credit of the winter coat is $175. Based on the purchase of the second item, the event tracking and forecasting computing platform 110 may reduce the actual credit for the user to $75. The event tracking and forecasting computing platform 110 may send a notification to the user device 140 indicating the unused credit for the winter coat (e.g., $75). The unused credit for the winter coat may be the actual credit (e.g., $175) minus the temporary credit used to purchase the second item (e.g., $100).

At step 220, the event tracking and forecasting computing platform 110 may provide feedback to the external event data source 130. For example, using the smart data, the event tracking and forecasting computing platform 110 may provide feedback for an item. For instance, the event tracking and forecasting computing platform 110 may receive a plurality of returns and/or exchanges corresponding to an item. The event tracking and forecasting computing platform 110 may track the number of returns and/or exchanges. Then, based on the number of returns and/or exchanges reaching a pre-determined threshold, the event tracking and forecasting computing platform 110 may provide feedback to the external event data source 130. For example, after reaching a hundred returns and/or exchanges for an item, the event tracking and forecasting computing platform 110 may determine that the item is defective and provide feedback to the external event data source 130 indicating the item is defective.

Figure 5:
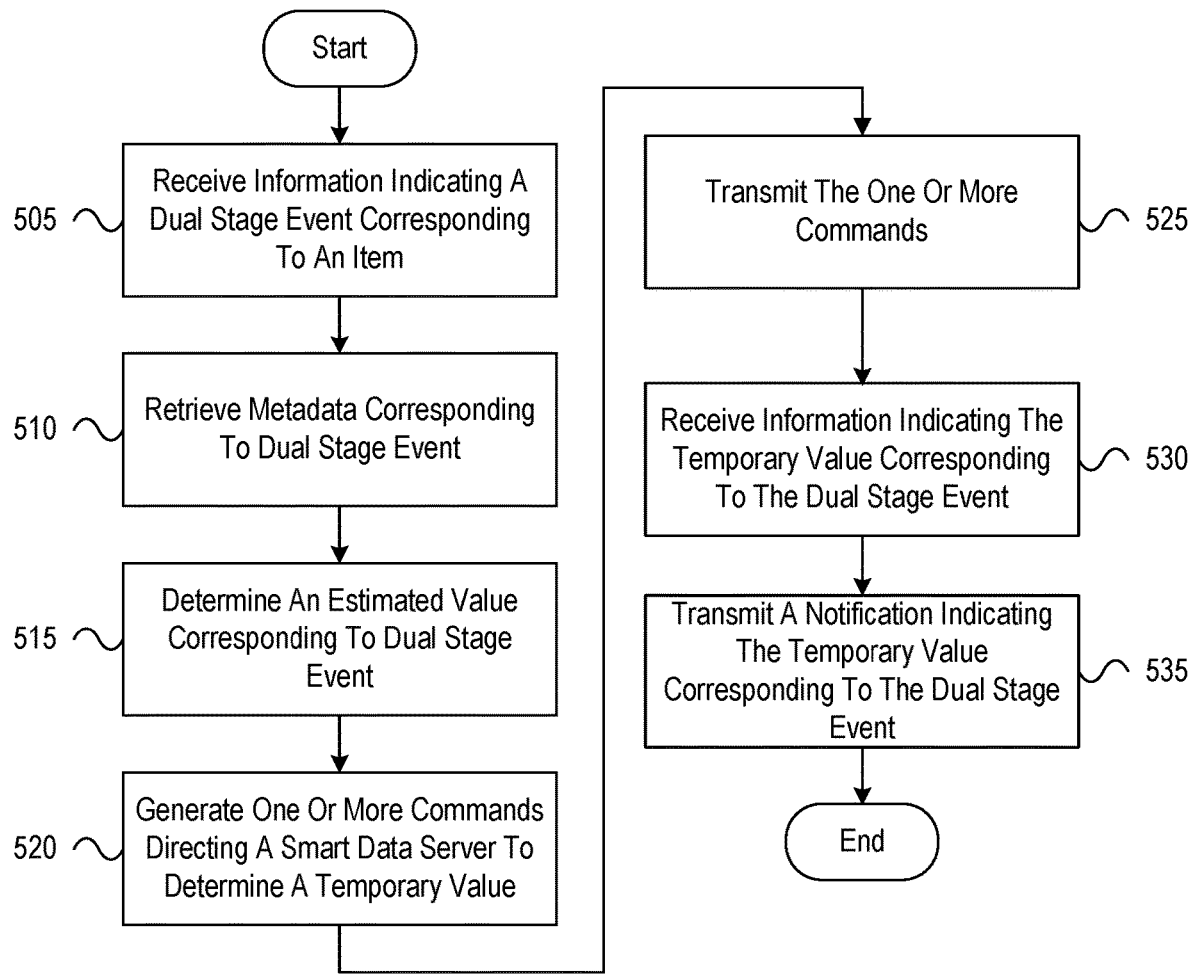
FIG. 5 depicts an illustrative method for using smart data to forecast and track dual stage events in accordance with one or more example embodiments.

FIG. 5 depicts an illustrative method for using smart data to forecast and track dual stage events in accordance with one or more example embodiments. Referring to FIG. 5, at step 505, a computing platform having at least one processor, a memory, and a communication interface may receive, via the communication interface and from a user device, information indicating a dual stage event corresponding to an item. At step 510, the computing platform may retrieve, from an external event data source and based on the information indicating the dual stage event, metadata corresponding to the dual stage event. At step 515, the computing platform may determine, based on the metadata corresponding to the dual stage event, a first value corresponding to the dual stage event. At step 520, the computing platform may generate, based on the information indicating the dual stage event corresponding to the item, one or more commands directing a smart data server to determine a second value corresponding to the dual stage event. At step 525, the computing platform may transmit, via the communication interface and to the smart data server, the one or more commands. At step 530, the computing platform may receive, via the communication interface and from the smart data server, information indicating the second value corresponding to the dual stage event. At step 535, the computing platform may transmit, via the communication interface and to the user device, a notification indicating the second value corresponding to the dual stage event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface and from a user device, information indicating a dual stage event corresponding to an item, wherein the information indicating the dual stage event corresponding to the item comprises a scanned item code corresponding to the item;
   retrieve, from an external event data source and based on the information indicating the dual stage event, metadata corresponding to the dual stage event;
   determine, based on the metadata corresponding to the dual stage event, a first value corresponding to the dual stage event, wherein determining the first value corresponding to the dual stage event comprises determining an estimated value of a credit to be refunded to a user of the user device by a merchant when the item is returned to the merchant and received by the merchant;
   generate, based on the information indicating the dual stage event corresponding to the item, one or more commands directing a smart data server to determine a second value corresponding to the dual stage event;
   transmit, via the communication interface and to the smart data server, the one or more commands;
   receive, via the communication interface and from the smart data server, information indicating the second value corresponding to the dual stage event, wherein receiving the information indicating the second value corresponding to the dual stage event comprises receiving information indicating a temporary credit to be provided to the user of the user device before the item is received by the merchant, wherein a value of the temporary credit is less than the estimated value and is modified based on a user profile and an adjustment identified in a return policy;
   receive, via the communication interface and from the user device, image data providing proof that the item is being returned to the merchant, the image data being received before the item is received by the merchant;
   responsive to receiving the image data, authorize the temporary credit to be provided to the user of the user device before the item is received by the merchant;
   transmit, via the communication interface and to the user device, a notification indicating the second value corresponding to the dual stage event, wherein transmitting the notification indicating the second value corresponding to the dual stage event comprises transmitting the information indicating the temporary credit to be provided to the user of the user device before the item is received by the merchant;
   determine, based on the information indicating the dual stage event, a geographic location associated with the dual stage event;
   determine, based on the geographic location associated with the dual stage event, a quality issue corresponding to the item; and
   transmit, via the communication interface and to the external event data source, the quality issue corresponding to the item.

2. The computing platform of claim 1, wherein the memory stores additional computer-readable instructions that, when executed by the at least one processor, cause the computing platform to:
   determine, based on the information indicating the dual stage event, a user profile; and
   retrieve, from the smart data server and based on the user profile, historical information corresponding to the user profile,
   wherein the second value corresponding to the dual stage event is based on the historical information corresponding to the user profile.

3. The computing platform of claim 2, wherein the second value corresponding to the dual stage event is based on the historical information corresponding to the user profile.

4. The computing platform of claim 1, wherein the memory stores additional computer-readable instructions that, when executed by the at least one processor, cause the computing platform to:
   determine, based on the information indicating the dual stage event, an item profile; and
   retrieve, from the smart data server and based on the item profile, historical information corresponding to the item,
   wherein the second value corresponding to the dual stage event is based on the historical information corresponding to the item.

5. The computing platform of claim 4, wherein the historical information corresponding to the item indicates a plurality of previous historical dual stage events corresponding to the item.

6. The computing platform of claim 1, wherein the memory stores additional computer-readable instructions that, when executed by the at least one processor, cause the computing platform to:
   determine, based on the information indicating the dual stage event corresponding to the item and the first value corresponding to the dual stage event, one or more alternative item recommendations; and
   transmit, via the communication interface and to the user device, the one or more alternative item recommendations.

7. The computing platform of claim 1, wherein the memory stores additional computer-readable instructions that, when executed by the at least one processor, cause the computing platform to:
receive, via the communication interface and from the external event data source, information indicating a completion of the dual stage event corresponding to the item; and
transmit, via the communication interface and to the user device, an indication of the completion of the dual stage event corresponding to the item.

8. The computing platform of claim 1, wherein the memory stores additional computer-readable instructions that, when executed by the at least one processor, cause the computing platform to:
receive, via the communication interface, information indicating an exchange corresponding to a second item, wherein the exchange uses the second value corresponding to the dual stage event; and
reduce, based on the exchange corresponding to the second item, the second value corresponding to the dual stage event.

9. The computing platform of claim 8, wherein the memory stores additional computer-readable instructions that, when executed by the at least one processor, cause the computing platform to:
receive, via the communication interface and from the external event data source, information indicating an actual value corresponding to the dual stage event;
determine, based on the reducing the second value corresponding to the dual stage event and the actual value corresponding to the dual stage event, an unused value corresponding to the dual stage event; and
transmit, via the communication interface and to the user device, the unused value corresponding to the dual stage event.

10. A method, comprising:
at a computing platform comprising at least one processor, memory, and a communication interface:
receiving, by the at least one processor, via the communication interface, and from a user device, information indicating a dual stage event corresponding to an item, wherein the information indicating the dual stage event corresponding to the item comprises a scanned item code corresponding to the item;
retrieving, by the at least one processor, from an external event data source and based on the information indicating the dual stage event, metadata corresponding to the dual stage event;
determining, by the at least one processor, based on the metadata corresponding to the dual stage event, a first value corresponding to the dual stage event, wherein determining the first value corresponding to the dual stage event comprises determining an estimated value of a credit to be refunded to a user of the user device by a merchant when the item is returned to the merchant and received by the merchant;
generating, by the at least one processor, based on the information indicating the dual stage event corresponding to the item, one or more commands directing a smart data server to determine a second value corresponding to the dual stage event;
transmitting, by the at least one processor, via the communication interface and to the smart data server, the one or more commands;
receiving, by the at least one processor, via the communication interface and from the smart data server, information indicating the second value corresponding to the dual stage event, wherein receiving the information indicating the second value corresponding to the dual stage event comprises receiving information indicating a temporary credit to be provided to the user of the user device before the item is received by the merchant, wherein a value of the temporary credit is less than the estimated value and is modified based on a user profile and an adjustment identified in a return policy;
receiving, by the at least one processor and from the user device, image data providing proof that the item is being returned to the merchant, the image data being received before the item is received by the merchant;
responsive to receiving the image data, authorizing, by the at least one processor, the temporary credit to be provided to the user of the user device before the item is received by the merchant; and
transmitting, by the at least one processor, via the communication interface and to the user device, a notification indicating the second value corresponding to the dual stage event, wherein transmitting the notification indicating the second value corresponding to the dual stage event comprises transmitting the information indicating the temporary credit to be provided to the user of the user device before the item is received by the merchant;
determining, based on the information indicating the dual stage event, a geographic location associated with the dual stage event;
determining, based on the geographic location associated with the dual stage event, a quality issue corresponding to the item; and
transmitting, via the communication interface and to the external event data source, the quality issue corresponding to the item.

11. The method of claim 10, comprising:
determining, by the at least one processor, based on the information indicating the dual stage event, a user profile; and
retrieving, by the at least one processor, from the smart data server and based on the user profile, historical information corresponding to the user profile,
wherein the second value corresponding to the dual stage event is based on the historical information corresponding to the user profile.

12. The method of claim 10, comprising:
determining, by the at least one processor, based on the information indicating the dual stage event, an item profile; and
retrieving, by the at least one processor, from the smart data server and based on the item profile, historical information corresponding to the item,
wherein the second value corresponding to the dual stage event is based on the historical information corresponding to the item.

13. The method of claim 10, comprising:
determining, by the at least one processor, based on the information indicating the dual stage event corresponding to the item and the first value corresponding to the dual stage event, one or more alternative item recommendations; and
transmitting, by the at least one processor, via the communication interface and to the user device, the one or more alternative item recommendations.

14. The method of claim 10, comprising:
receiving, by the at least one processor, via the communication interface and from the external event data source, information indicating a completion of the dual stage event corresponding to the item; and
transmitting, by the at least one processor, via the communication interface and to the user device, an indication of the completion of the dual stage event corresponding to the item.

15. The method of claim 10, comprising:
receiving, by the at least one processor, via the communication interface, information indicating an exchange corresponding to a second item, wherein the exchange uses the second value corresponding to the dual stage event; and
reducing, by the at least one processor, based on the exchange corresponding to the second item, the second value corresponding to the dual stage event.

16. The method of claim 15, comprising:
receiving, by the at least one processor, via the communication interface and from the external event data source, information indicating an actual value corresponding to the dual stage event;
determining, by the at least one processor, based on the reducing the second value corresponding to the dual stage event and the actual value corresponding to the dual stage event, an unused value corresponding to the dual stage event; and
transmitting, by the at least one processor, via the communication interface and to the user device, the unused value corresponding to the dual stage event.

17. One or more non-transitory computer-readable media storing instructions that, when executed by a computing platform comprising at least one processor, memory, and a communication interface, cause the computing platform to:
receive, via the communication interface and from a user device, information indicating a dual stage event corresponding to an item, wherein the information indicating the dual stage event corresponding to the item comprises a scanned item code corresponding to the item;
retrieve, from an external event data source and based on the information indicating the dual stage event, metadata corresponding to the dual stage event;
determine, based on the metadata corresponding to the dual stage event, a first value corresponding to the dual stage event, wherein determining the first value corresponding to the dual stage event comprises determining an estimated value of a credit to be refunded to a user of the user device by a merchant when the item is returned to the merchant and received by the merchant;
generate, based on the information indicating the dual stage event corresponding to the item, one or more commands directing a smart data server to determine a second value corresponding to the dual stage event;
transmit, via the communication interface and to the smart data server, the one or more commands;
receive, via the communication interface and from the smart data server, information indicating the second value corresponding to the dual stage event, wherein receiving the information indicating the second value corresponding to the dual stage event comprises receiving information indicating a temporary credit to be provided to the user of the user device before the item is received by the merchant, wherein a value of the temporary credit is less than the estimated value and is modified based on a user profile and an adjustment identified in a return policy;
receive, via the communication interface and from the user device, image data providing proof that the item is being returned to the merchant, the image data being received before the item is received by the merchant;
responsive to receiving the image data, authorize the temporary credit to be provided to the user of the user device before the item is received by the merchant;
transmit, via the communication interface and to the user device, a notification indicating the second value corresponding to the dual stage event, wherein transmitting the notification indicating the second value corresponding to the dual stage event comprises transmitting the information indicating the temporary credit to be provided to the user of the user device before the item is received by the merchant;
determine, based on the information indicating the dual stage event, a geographic location associated with the dual stage event;
determine, based on the geographic location associated with the dual stage event, a quality issue corresponding to the item; and
transmit, via the communication interface and to the external event data source, the quality issue corresponding to the item.

* * * * *